United States Patent [19]

DeBeer

[11] Patent Number: 5,401,719
[45] Date of Patent: Mar. 28, 1995

US005401719A

[54] DRILLING MUD ADDITIVE

[75] Inventor: Johannes M. DeBeer, Cape Province, South Africa

[73] Assignee: Chemical Services Limited, Sandton, South Africa

[21] Appl. No.: 281,145

[22] Filed: Jul. 27, 1994

Related U.S. Application Data

[63] Continuation of Ser. No. 985,486, Dec. 4, 1992, abandoned.

[30] Foreign Application Priority Data

Dec. 6, 1991 [ZA] South Africa ............... 91/9646

[51] Int. Cl.$^6$ ................................................. C09K 7/00
[52] U.S. Cl. ........................................ 507/127; 507/140
[58] Field of Search .......................... 507/100, 140, 127

[56] References Cited

U.S. PATENT DOCUMENTS

| | | | |
|---|---|---|---|
| 1,856,354 | 10/1958 | Armentrout | 252/8.5 |
| 2,551,874 | 5/1951 | Cerf | 252/8.5 |
| 2,871,189 | 1/1959 | Brukner . | |
| 4,137,367 | 1/1979 | Sample, Jr. et al. | 428/433 |
| 4,609,487 | 9/1986 | Burkhardt et al. | 252/8.514 X |

FOREIGN PATENT DOCUMENTS 1105815 7/1955 France .
WO91/18077 11/1991 WIPO .

OTHER PUBLICATIONS

Database WPIL/Derwent Publications Ltd., London, G. B., AN 92-129897.
Gray et al, *Composition and Properties of Oil Well Drilling Muds* (Houston, Gulf Publishing Co., 1980) pp. 556–557, 579–582 TN 871.2 G695.

*Primary Examiner*—Gary Geist
*Attorney, Agent, or Firm*—Finnegan, Henderson, Farabow, Garrett & Dunner

[57] ABSTRACT

A drilling mud additive comprising graphite, a silicate such as phlogopite and a silicone such as dimethylpolysiloxane and drilling muds including the additive.

10 Claims, No Drawings

DRILLING MUD ADDITIVE

This application is a continuation of application Ser. No. 07/985,486, filed Dec. 4, 1992, now abandoned.

Drilling muds are used in the sinking of boreholes, especially deep-level boreholes sunk in the search for hydrocarbons (including gas), to lubricate the drill pipe and act as a carrier for excavated drill cuttings. The drilling fluid or mud is pumped down the drill pipe, through nozzles in the drill bit at the bottom of the borehole and up the annulus between the drill pipe and borehole wall. Drilled cuttings generated by the drill bit are taken up by the mud and transported to the surface of the borehole where they are separated from the drilling mud and discarded. The drilling mud may be cleaned and re-used. The drill pipe is thus able to operate freely within the borehole. Drilling muds commonly incorporate bentonite which is made up as a hydro colloid base for water soluble polymers.

Apart from its function as a carrier for the cuttings, however, a drilling mud operates, inter alia, to lubricate the drill pipe and bit as well as the wall of the borehole thereby reducing torque, overpull and wear as well as sticking of the drill pipe in the borehole especially in highly deviated wells; it provides a hydrostatic balance with the geological structure being drilled thereby minimising the possibility of cave-in of the borehole wall and to keep high pressure hydrocarbons from entering the well before a casing is run; and it forms an impermeable membrane on the borehole wall which operates to prevent the liquid phase in the drilling fluid from migrating to the geological formation, causing clays and shales to swell. In addition, the drilling mud acts to cool the drill bit and other high-pressure wear areas and it should also possess a suitable viscosity so as to suspend the drill cuttings when the drilling mud pumps are stopped. To enhance these functions the drilling mud may incorporate additives such as hydrocarbon oil lubricants and polymers for controlling flow characteristics of the drilling mud.

A satisfactory drilling mud should preferably, however, also be non-toxic, both to man and the environment. With boreholes sunk on dry land it is possible to minimise the pollution effects of drilling muds which contain moderately toxic components such as hydrocarbon additives. However, when the search for oil is extended to the sea bed the problem is intensely magnified, aquatic life being highly susceptible to hydrocarbon contamination even at low concentrations.

Traditionally the performance of water-based drilling muds is considered in the oil drilling industry to be inferior to that of oil-based drilling muds or, to water-based drilling muds containing hydrocarbon-based additives to improve their performance.

The polluting aspect and toxicity levels of water-based drilling muds on the other hand are far lower than those or oil-based drilling muds. Despite this and regardless of the fact that water-based drilling muds are less costly than the oil-based muds, the latter are preferred by drill rig operators especially if they have to drill through formations which are relatively unknown or are known to be troublesome.

This has led to the wide-spread use of oil-based drilling muds which in turn has given rise to pollution on such a scale, even by the so-called "low aromatic content, environmentally acceptable oil-based drilling fluids", that various countries especially in Europe, have imposed strict legislation regarding the use of hydrocarbon containing drilling muds.

In order to alleviate the pollution problem caused by oil containing drilling muds, the solid waste may be chemically treated or burned so that it can be dumped at allocated sites, or used to backfill the annulus between the metal borehole casing and the wellbore. These are costly measures and sometimes not capable of coping with the full quantity of cuttings generated.

It is an object of the invention to provide a drilling mud which possesses suitable performance in the facilitation of drilling of boreholes and which excludes components which are harmful to the environment, especially sea and other aquatic environments.

It is also an object of the invention to provide a pollution-free drilling mud additive which is capable of upgrading the lubricating qualities of water-based drilling muds to rival those of oil-based products and which will also maintain or enhance the other functions of water-based drilling muds.

According to the invention a drilling mud is characterised in that it includes graphite, silicate and silicone conditioning constituents, the drilling mud being free of hydrocarbon and/or heavy metal contaminants.

The invention also includes within its scope a drilling mud conditioning additive composition which comprises a suitable admixture of the graphite, silicate and silicone materials.

The preferred concentrations by weight of the constituents of the additive are
graphite 20% to 85% most preferably 45 to 69%
silicate 10% to 45% most preferably 10 to 32%
silicone 1% to 35% most preferably 5 to 35%.

The raw material graphite component of the additive composition may be synthetic or natural and preferably has a particle size distribution below 70 microns. The silicate component may be selected from a wide range of minerals including vermiculite, biotite, serpentinite, muscavite, phlogopite, eastonire, mica, or mixtures thereof. The particle size distribution of the silicate is also preferably below 70 microns. The silicone component may also be selected from a range of silicone materials including organosiloxanes, oxosiloxanes, methyl siloxanes, polysiloxanes, polyorganosiloxanes or mixtures thereof and may incorporate a proportion of up to 15% of hydrophobic silica having a particle size of less than 1 micron.

The additive composition constitutes a black-grey powder with a strong oleophilic nature. It has particles in the size range from 20 Angstrom to 70 micron; a specific gravity between 1,6–2,2; a pH of 7,0 to 8,8 (10% by weight additive composition in distilled water) and has a Mohs hardness between 1 and 3. It is insoluble in water or oil but easily dispersible in either and is compatible with anionic and cationic drilling fluid additives.

The drilling mud additive is easy to mix with conventional constituents to provide a drilling mud composition according to the invention which provides non-polluting, non-toxic drilling fluids without sacrificing performance. The components of the drilling mud additive composition are inert minerals which are not affected by temperature, salinity, multi-valent ions, microbiological activity and pH changes.

The primary function of the graphite is lubrication although it also acts as a carrier medium for the silicate minerals. That of the silicate minerals is a carrier medium for the silicone material. The silicate minerals additionally act as a binder producing thin, slippery but tough membranes, also known as filter-cakes, on the borehole wall. Furthermore, the silicate minerals function to prevent the silicone compound from migrating upwards if submerged in an aqueous phase such as water-based drilling fluids. As the additive composition of the invention comprises a fine grained, low density powder, the silicate minerals may be pre-treated with 0,5 to 15% (by weight) of water to reduce dust from forming while mixing the additive with further components to form a drilling mud at rigsite. This is done to decrease any health risk which may arise from using fine grained powders. The silicone material is employed to increase the hydrophobic nature of the silicate minerals and the graphite. It also alters the surface tension of the graphite enabling the silicate minerals to bind therewith.

The additive of the invention gives rise to a synergistic effect with common drilling mud additives such as starch, carboxymethylcellulose and derivative polymer materials. These polymers are adversely affected by temperature, salinity, multi-valent ions, micro-biological activity and pH changes. As the additive of the invention is not adversely affected by these factors, it enhances the properties of the susceptible constituents when suitable ratios of the materials are employed.

A typical drilling mud formulation according to the invention may contain:

| | | |
|---|---|---|
| i] | prehydrated API bentonite | 17,00–50,00 kg/m³ |
| ii] | carboxymethylcellulose, polyanionic cellulose or starch polymer | 3,00–11,42 kg/m³ |
| iii] | rheology modifying polymer such as xanthan gum | 0,71–1,42 kg/m³ |
| iv] | the additive of the invention comprising graphite, silicate and silicone material in the proportion specified above | 8,57–11,42 kg/m³. |

Salts, dispersants and weighting material are added as required as well as water to the required volume.

Such a drilling mud formulation possesses satisfactory high temperature, high pressure filtration properties without any need for additional polymer products.

An example of the preparation of a conditioning composition and drilling mud according to the invention is given below.

EXAMPLE

A drilling mud conditioning additive according to the invention was formed comprising

| | |
|---|---|
| graphite | 56,5% by weight |
| phlogopite | 18,5% by weight |
| silicone emulsion | 25,0% by weight. |

The graphite employed was a synthetic material with a particle size of less than 20 microns. It was free of all impurities. The phlogopite [Palamica] used was also a pure material free of mica, silica and other mineral impurities. It had a particle size distribution as follows:

| | |
|---|---|
| less than 45 micron | 100% |
| greater than 25 micron | 5% |
| less than 25 micron | 95%; | a pH of 7–9 [10% phlogopite by weight dispersed in distilled water]; and a specific gravity of 2,2–2,5.

The silicone emulsion used as the raw material was that known as "SILFOAMEX GB", a product marketed in the Republic of South Africa by Chemical Services Limited and is a pure 30% dimethylpolysiloxane composition.

The constituents of the additives were blended in two stages as follows:

Initial dry blending of the graphite and phlogopite was carried out until a homogenous blend was obtained using effective dust control mixing equipment.

Secondary blending of the silicone emulsion with the homogenous blend of graphite and phlogopite was carried out with the application of sufficient shear to disperse and break up small granules formed during the addition of the dimethylpolysiloxane emulsion. A black-grey powder resulted that possessed strong surface coating qualities.

The drilling mud conditioning agent prepared as set out above is completely hydrocarbon free and is neither toxic nor combustible. It may be incorporated with common water-based drilling mud constituents which are also non-toxic in both land and aquatic environments to provide a drilling mud composition with good lubrication qualities providing low torque and low drag effects which rival those of oil-based products especially where deviated drilling is involved. It also gives excellent fluid loss control and wellbore stabilization properties and acts to coat potential swelling clays with an oleophilic membrane, thus inhibiting the water absorption abilities of formation clays. The additive also does not affect the theology of the drilling mud. The additive ensures the formation of tough but thin coatings on the walls of boreholes drilled with the aid of the drilling mud of the invention. Preferably the coating encapsulation of the cutting formation is enhanced with the use in the mud also of conventional polymer materials such as carboxymethylcellulose.

Thus a drilling mud prepared by simple mixing of 8,57–11,42 kg/m³ of the additive; 3,00–11,42 kg/m³ of carboxymethyl-cellulose; 0,71–1,42 kg/m³ of xanthan gum rheology modifying polymer; 17–50 kg/m³ of prehydrated bentonite and water to the required volume, resulted in the American Petroleum Institute "High Temperature High Pressure" test in only 14 to 18 ml of liltrate depending on the type of system used. In addition the above drilling mud provides good torque and drag reduction in the drilling operations and can be-used without damage to aquatic life in sea-bed drilling operations.

I claim:

1. A drilling mud conditioning additive composition comprising a blended admixture of synthetic graphite having a particle size of less than 20 microns and constituting 56.5% of the mass of the composition, phlogopite substantially free of mica, silica and other mineral impurities and having a particle size distribution in which all the particles are less than 45 microns in size and 95% thereof are less than 25 microns in size and a 30% emulsion of dimethylpolysiloxane in water, said dimethylpolysiloxane enhancing the hydrophobic properties of the graphite and the phlogopite.

2. A drilling mud conditioning additive composition comprising a blended admixture of graphite, a silicate mineral selected from the group consisting of vermiculite, biotite, serpentinite, muscavite, phlogopite, eastonite, mica, and mixtures thereof and a silicone material, said silicone material enhancing the hydrophobic properties of the graphite and the silicate mineral.

3. The additive composition of claim 2, comprising, by weight, from 20% to 85% of graphite, from 10% to 45% of a silicate mineral and from 1% to 35% of a silicone material.

4. The additive composition of claim 3, comprising, by weight, from 45% to 69% of graphite, from 10% to 32% of a silicate mineral and from 5% to 35% of a silicone material.

5. The additive composition of claim 3, in which the graphite is synthetic graphite and has a particle size distribution below 70 microns.

6. The additive composition of claim 3, in which the particle size distribution of the silicate mineral is below 70 microns.

7. The additive composition of claim 3, in which the silicone material is selected from the group consisting of organosiloxanes, oxosiloxanes, methyl siloxanes, polysiloxanes, polyorganosiloxanes and mixtures thereof.

8. The additive composition of claim 7, in which the silicone material incorporates up to 15% of hydrophobic silica having a particle size of less than 1 micron.

9. The additive composition of claim 3, which has a particle size in the range from 20 Angstrom to 70 micron; a specific gravity between 1.6 and 2.2 and a Mohs hardness between 1 and 3.

10. A drilling mud formulation consisting essentially of
a) from 8.57 to 11.42 kg/m$^3$ of the additive composition of any one of claims 3 to 9;
b) from 17.0 to 50.0 kg/m$^3$ of pre-hydrated bentonite;
c) from 3.0 to 11.42 kg/m$^3$ of carboxymethylcellulose, polyanionic cellulose or starch polymer;
d) from 0.71 to 1.42 kg/m$^3$ of a rheology modifying polymer; and
e) the balance selected from water, salts, dispersants and weighting material or combinations thereof.

* * * * *

UNITED STATES PATENT AND TRADEMARK OFFICE
CERTIFICATE OF CORRECTION

PATENT NO. : 5,401,719
DATED     : March 28, 1995
INVENTOR(S) : Johannes M. De Beer It is certified that error appears in the above-indentified patent and that said Letters Patent is hereby corrected as shown below:

Claim 10, column 6, line 13, change "3" to --1--.

Signed and Sealed this

Eighteenth Day of July, 1995

Attest:

BRUCE LEHMAN

*Attesting Officer*        *Commissioner of Patents and Trademarks*